FREQUENCY MODULATION APPARATUS

Filed March 17, 1961 3 Sheets-Sheet 1

INVENTOR.
H. SEIDEL

BY David P. Heller

ATTORNEY

May 11, 1965 H. SEIDEL 3,183,456

FREQUENCY MODULATION APPARATUS

Filed March 17, 1961 3 Sheets-Sheet 2

INVENTOR.
H. SEIDEL
BY David P. Kelley
ATTORNEY

INVENTOR.
H. SEIDEL
BY David P. Kelley
ATTORNEY

United States Patent Office 3,183,456

Patented May 11, 1965

3,183,456

FREQUENCY MODULATION APPARATUS

Harold Seidel, Fanwood, N.J., assignor to Bell Telephone Laboratories, Incorporated, New York, N.Y., a corporation of New York Filed Mar. 17, 1961, Ser. No. 96,491

4 Claims. (Cl. 332—29)

This invention relates to frequency modulation apparatus and, more particularly, to apparatus for producing relatively large frequency deviations about a stable mean or center frequency.

In frequency modulation systems information is transmitted by means of changes in the frequency of a periodically varying carrier current. It is a desideratum of such sytems that the variations in the carrier frequency take place about a stable center frequency. It will be readily appreciated that further advantages in frequency modulation communication systems may be realized by maximizing the sensitivity of deviating means to variations in the magnitude of the input signal. Thus it is desirable that frequency modulation systems include means for generating a stable carrier current and means for producing wide frequency deviations in the carrier frequency in response to signal information. Furthermore, it is highly desirable that the relation between the magnitude of the input signal and the extent of the carrier frequency deviation be linear.

While the above-mentioned desiderata are found individually or in varying combinations and to different degrees in prior art devices, there are numerous advantages to be derived from an arrangement in which several are found to a high degree.

It is, therefore, an object of this invention to provide frequency modulation apparatus characterized by a high degree of sensitivity to input signal variations, by practically absolute stability with respect to a means carrier frequency, and by an unusually wide band of linearity in the relation between input and carrier frequency deviation.

In some priorly known systems frequency modulated signals have been generated by means of electronic oscillating circuits which include variable reactances, such as reactance tubes, for changing the oscillation frequency in accordance with input signal information. In other types of systems the outputs of two high frequency oscillators, such as klystrons, have been caused to beat together, producing an intermediate frequency signal. The frequency of the I.F. signal is then modulated by varying the output frequency of one of the oscillators.

Such systems are subject to the disadvantages normally associated with circuits comprising thermionic devices. More specifically, the characteristics of devices such as reactance tubes and klystrons are not only functions of the current flowing through them but are not rigidly determinable. They tend to vary with each specific device and, in addition to being dependent on operating conditions, undergo changes at varying rates during the life of the tube. One serious consequence of the above-mentioned characteristic of thermionic devices is instability of the center frequency of the output signal, i.e., drift.

Accordingly, it is another object of this invention to produce a high index frequency modulated signal by means of apparatus the characteristics of which are independent of thermionic effects.

A further difficulty encountered in systems employing two high frequency oscillators arises from the necessity of maintaining a definite phase relation between their outputs. In addition, it is practically impossible to achieve absolute stability of the center frequency in such systems, since the difference between the two outputs depends not only on the mutually independent drifts of the oscillators, but also on the average frequency of the oscillator to which the input signal is applied.

Therefore, a further object of this invention is the generation of a stable frequency modulated I.F. carrier by beating together two accurately controllable high frequency oscillations.

Another object of this invention is the generation of a stable, high index frequency modulated signal by beating together two accurately controllable and synchronously variable high frequency oscillations.

These and other objects of the invention are achieved in one illustrative embodiment comprising a parametric amplifier to which is coupled a resonant tank circuit characterized by a voltage-controllable resonant frequency, a pumping source for supplying energy to the parametric amplifier, a variable capacitance diode for varying the resonant frequency of the tank circuit in accordance with signal information, and an output circuit for abstracting a frequency modulated output from the parametric amplifier.

It is a well-known characteristic of variable reactance or parametric amplifiers, such as those which operate by means of an internal variable capacitance, that a signal of frequency $f_s$ may be "pumped up," that is, amplified, by varying the reactance at a pump frequency $f_p$ which is exactly equal to $2f_s$. Maximum transfer of energy from the pumping wave to the signal wave is effected when $f_p=2f_s$ and the amplitude extrema of the pump wave coincide with extrema of the signal wave. In practice, however, it is seldom possible to maintain such an absolutely precise relation between the pump and the signal waves. As a result, the output of the parametric amplifier is not confined exclusively to the signal frequency but instead is a modulated wave form which may be shown to be the sum of two sine waves having frequencies $f_s$ and $f_p-f_s$. Thus, when the frequency of the signal input to a parametric amplifier differs from $\frac{1}{2}f_p$ the output is composed of two frequencies at equal distances above and below $\frac{1}{2}f_p$. Because of this symmetry the difference frequency is known as the image frequency. Since the image signal is an inevitable but generally unused by-product of parametric amplification, it is sometimes called the "idler."

If follows from the above that the closer $f_s$ is to $\frac{1}{2}f_p$, the closer it is also to the image frequency. When the signal and image frequencies are close together, the amplified signal and the image signal have approximately the same amplitude. Under these conditions it is relatively difficult to separate the desired signal frequency from the useless image. Therefore, when the device is included in circuits wherein it functions as a negative resistance amplifier, care is taken to see that a fairly wide band of separation is maintained between $f_s$ and $\frac{1}{2}f_p$. A filter is then provided to prevent the image signal from appearing at the output terminal of the amplifier.

In a frequency modulation arrangement following the principles of the invention, however, the image signal is used advantageously as a signal whose frequency deviations are synchronously related to those of the input signal. In accordance with the present invention a parametric amplifier is made to oscillate by providing an impedance mismatch at its output terminal. The frequency of oscillation differs slightly from $\frac{1}{2}f_p$ so that the output of the parametric oscillator, according to the theory described above, is composed of a signal and an image frequency at equal distances above and below one-half the pump frequency. By changing the frequency of oscillation a conjugate change is caused in the image frequency. Thus it can be seen that the separation between the signal and image frequencies varies by an amount twice as great as the variation in either frequency taken by itself. Furthermore, the separation frequency is generally much lower than either the signal or the image frequency, so that the relatively small frequency deviations of the signal are translated into relatively very large deviations of the separation frequency.

The features of the invention may be more fully understood from the following discussion taken in conjunction with the accompanying drawings in which.

Figure 1:
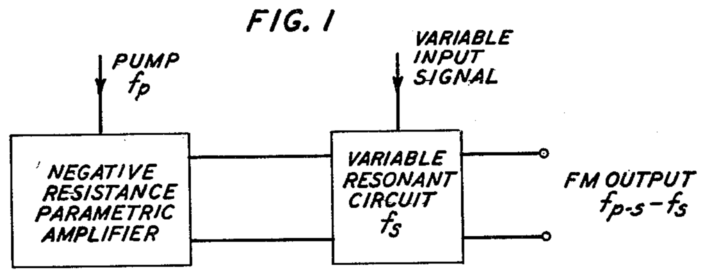
FIG. 1 is a block schematic diagram of one illustrative embodiment of the invention.
Figure 2:
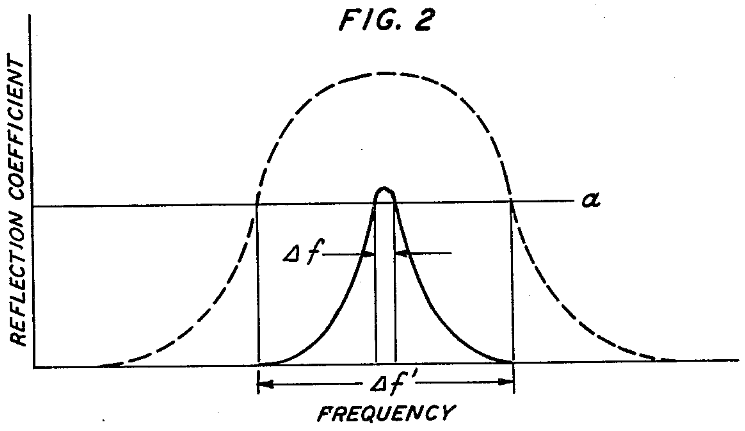
FIGS. 2 and 2A are curves illustrating some important characteristics of a circuit in accordance with the invention.

Turning now to FIG. 1, there is shown in block schematic form a negative resistance parametric amplifier coupled to a tuned circuit which is resonant at a signal frequency. At resonance the tuned circuit acts as a conductance across the transmission line leading to the parametric amplifier. The conductance creates an impedance mismatch so that energy having a frequency within the resonant bandwidth $\Delta f'$ is reflected back into the amplifier. The impedance mismatch may be expressed as a reflection coefficient, a typical example of which is plotted as a function of frequency in FIG. 2. As can be seen from FIG. 2, when the reflection coefficient exceeds a certain level, represented by the line *a*, the amplifier will be made to oscillate. The threshold level is determined primarily by the excess of the reflected energy over the losses in the system.

Figure 2A:
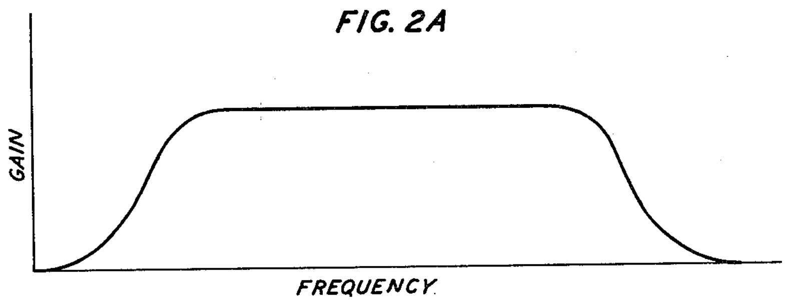

However, since the parametric amplifier is typically a rather wideband device, oscillation will normally occur at many different frequencies within the resonant bandwidth. The qualitative relation between the bandwidth of the amplifier and the resonant bandwidth will be apparent from a comparison of FIGS. 2 and 2A. FIG. 2A is a plot of the amplifier gain as a function of frequency. The useful bandwidth of the amplifier is represented by the broad central portion of the curve. Oscillation may be produced when the reflection coefficient has a peak within the indicated frequency range. One convenient method of narrowing the frequency range over which oscillation can occur is to decouple the amplifier and the tuned circuit so that a sufficiently high reflection coefficient is produced over a more limited region. If the reflection coefficient exceeds the threshold level by a relatively large amount, oscillation can occur over a frequency band illustrated, for example, by the peak of the dash curve of FIG. 2. This is the situation when the amplifier and the tuned circuit are closely coupled. A desirable configuration resulting from a loose coupling is indicated by the solid curve in FIG. 2.

Figure 3:
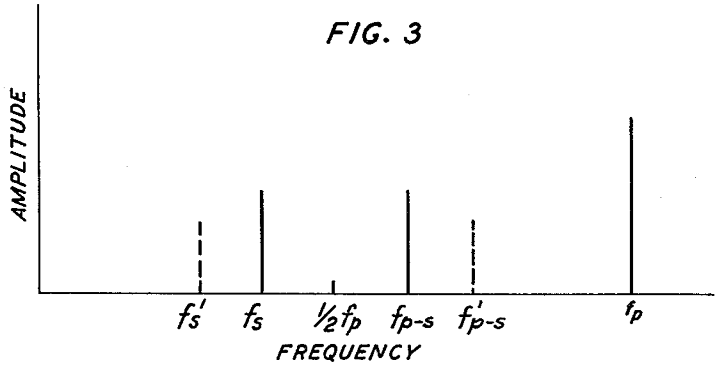
FIG. 3 is a frequency spectrum depicting schematically the characteristics of a parametric amplifier employed in the invention.

FIG. 3 indicates the relations among the pump, signal and idler frequencies of a parametric amplifier. These are designated $f_p$, $f_s$, and $f_{p-s}$, respectively. In accordance with the theory described above, oscillation of the parametric amplifier at the resonant frequency $f_s$ of the tuned circuit is inevitably accompanied by the production of an image oscillation at the difference frequency $f_{p-s}$. If now the resonant frequency of the tank circuit is changed, for example, by varying the capacitance of a varactor diode in the tank circuit, the signal and image frequencies are shifted by equal and opposite amounts. The resulting frequencies are indicated as $f'_s$ and $f'_{p-s}$. The output frequency of the invention is the difference between the signal frequency and the image frequency. Thus by applying the input signal in the form of a varying voltage to a voltage controllable reactance in the tank circuit, an output frequency deviation is produced which is double the change in the resonant frequency of the tank. In addition, as the output is equal to the difference between the signal and image frequencies, it is at a much lower frequency than either of them. Therefore, the output frequency deviation is relatively extremely large.

For example, if the parametric amplifier is supplied with a pump wave having a frequency of 1000 megacycles per second and is made to oscillate by shunting it with a tank circuit resonant at 480 megacycles per second, the image frequency will be 520 megacycles per second. The output is the difference frequency, or 40 megacycles. Now let the resonant frequency of the tank circuit change to 490 megacycles per second. The signal and image frequencies thus become 490 and 510 megacycles per second, respectively. While the signal and image have each changed by 10 megacycles per second, the difference frequency, which is the output, has changed by 20 megacycles per second, a decrease of 50 percent.

It is a further feature of the invention that the mean or center frequency of the FM output is easily maintained at a stable value. This follows from the fact that the physical principles underlying the operation of the parametric amplifier necessarily and inevitably imply that the center frequency is always equal to $\frac{1}{2}f_p$. The mean carrier frequency may thus be made independent of the disturbing influences which affect the operation of thermionic devices, being dependent only on the pump frequency which may be determined by a maximally stable oscillator. For example, the pump frequency can be conveniently controlled by means of a piezoelectric crystal. The stability achieved in this manner far surpasses that which may be achieved by means of conventional frequency modulation apparatus which is generally dependent upon local oscillators comprising reactance tubes or klystrons.

In addition to providing a stable output the invention is characterized by a relatively high sensitivity. It is to be noted that the sensitivity of priorly known systems is directly dependent on the sensitivity of a variable reactance in an oscillator. For any given type of variable reactance, however, an arrangement in accordance with this invention provides at least twice the sensitivity heretofore achieved. This result follows from the fact that a reactance shift sufficient to produce a given change in the resonant frequency of an oscillator will produce, in the invention, equal but opposite shifts in two synchronously related frequencies. As the output is the difference between these two frequencies, the net change produced is double that produced in either frequency alone.

Figure 5:
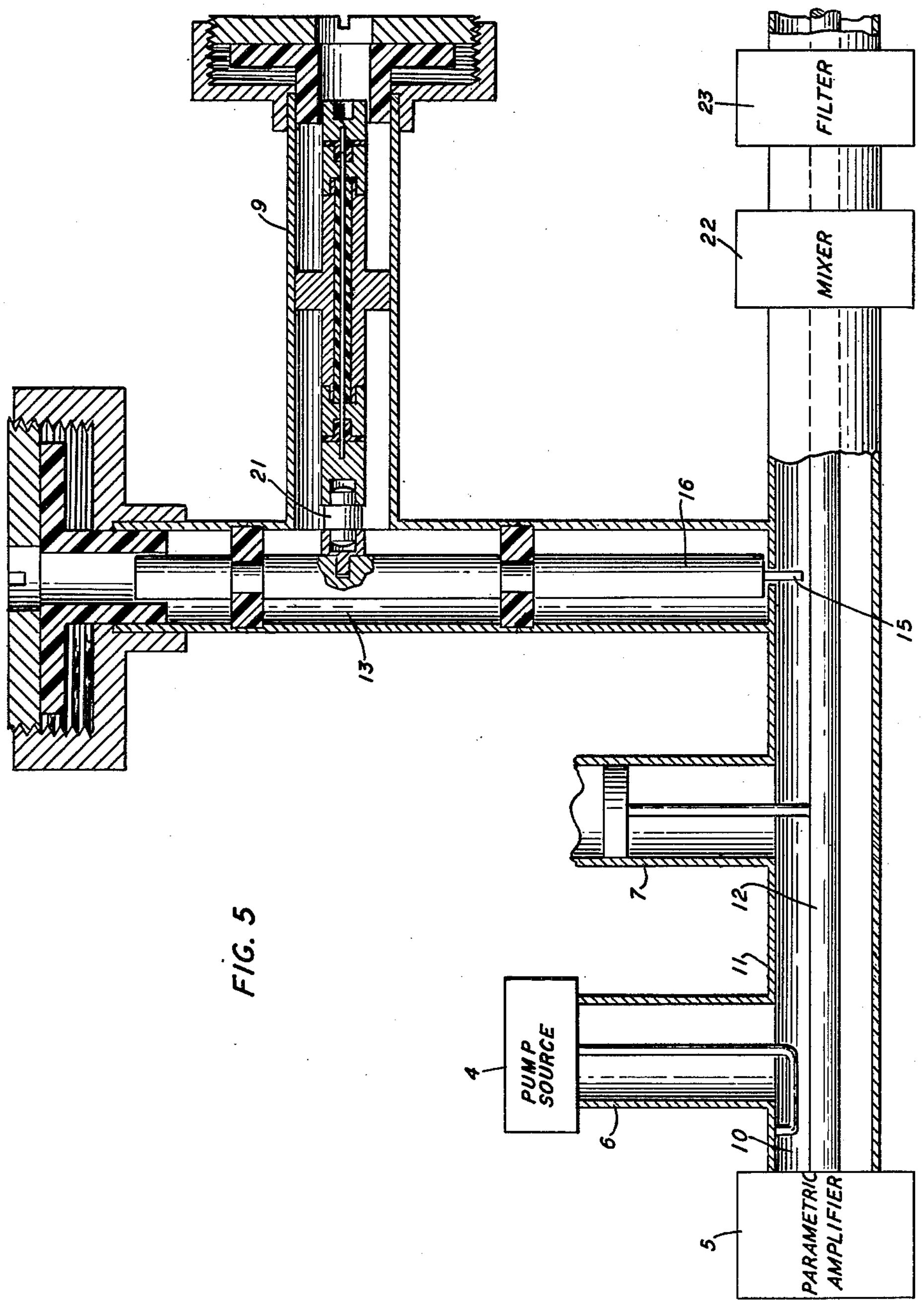
FIG. 5 is a view of a specific illustrative embodiment in accordance with the principles of the invention.

A specific illustrative embodiment is shown in more detail in FIG. 5, in which a negative resistance parametric amplifier 5 is coupled to a coaxial wave guide 10 comprising outer conductor 11 and center conductor 12. Pump power at frequency $f_p$ is supplied to the amplifier 5 from the source 4 which is coupled to the stub 6. A tunable stub 7 is provided to aid in adjusting the system.

A resonant cavity 13 is loosely coupled to the coaxial line 10 by means of a center conductor 16 which terminates as a probe 15 positioned near the center conductor 12 of the line 10. The cavity 13 is resonant at a signal frequency $f_s$ which is approximately equal to one-half $f_p$. At resonance the cavity 13 acts as a short circuit across the line 12. Energy within the resonant bandwidth is thus reflected back to the amplifier 5 and regenerated. Due to the loose coupling between the line and the cavity, however, the reflection coefficient is insufficient over most of the band to cause regenerative oscillator. Advantageously the couple is adjusted so that oscillation occurs only over a very narrow band.

A second cavity 9, also resonant at one-half $f_p$, is coupled to the cavity 13. A varactor diode 21 is mounted with one end of its capsule in the cavity 9 and the other end in contact with the center conductor 16 of the cavity 13. In effect, this arrangement provides a variable capacitance shunting the cavity 13. The shunt capacity is controlled by applying an input or control voltage to the diode 21. When the capacitance is varied in accordance with the input signal the resonant frequency of the cavity 13 is shifted accordingly, producing equal and opposite shifts in the signal and image frequencies associated with the parametric amplifier 5. The output of the parametric oscillator passes from the line 10 to a mixer 22 and filter 23, which abstracts the frequency modulated difference between the signal and image oscillations.

Figure 4:
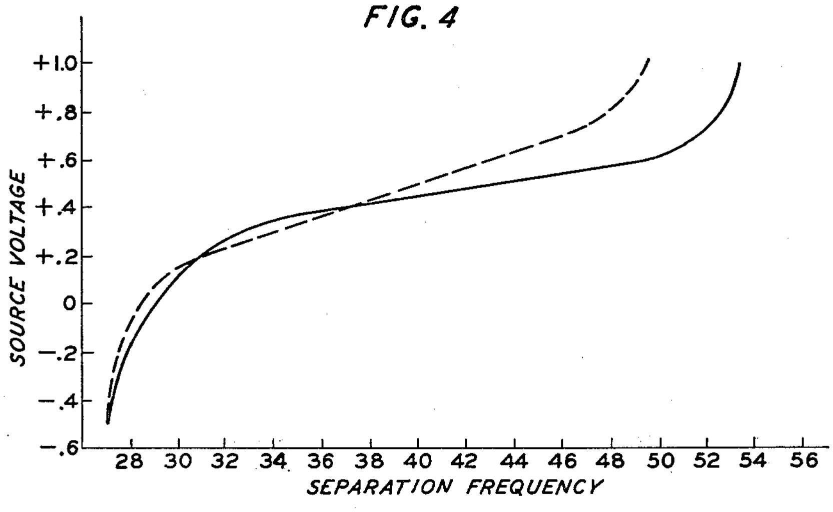
FIG. 4 is a plot of output frequency versus input signal voltage, as measured upon the embodiment shown in FIG. 5.

An arrangement of the type illustrated is characterized by extreme sensitivity to fluctuations in the input signal. Thus, in a typical embodiment a pump of 1000 megacycles was applied to the parametric amplifier to produce signal and image frequencies equidistant from 500 megacycles. The measured sensitivity was 30 megacycles deviation per volt of input signal. The same arangement was also characterized by a very wide band of linearity. Two typical measurements of the difference frequency versus input voltage are plotted in FIG. 4. As can be seen, linearity extends over a band about 15 megacycles wide.

It has been shown that in accordance with the principles of the invention a simple, compact circuit may be realized using solid state components and capable of producing extremely wide frequency deviations about an exceptionally stable center frequency. Furthermore, a circuit in accordance with the invention is very sensitive and is characterized by a high degree of linearity over a wide frequency band.

While the invention has been described with reference to a specific embodiment, many modifications and variations are possible and may be made by those skilled in the art. For example, a high index frequency modulated output may be produced about center frequencies which are harmonics of one-half the pump frequency. Thus, consider an illustrative embodiment in which the pump frequency is 1000 megacycles and the signal and image frequencies deviate over a 50-megacycle band centered about 500 megacycles. If the parametric amplifier is a good harmonic generator it becomes possible to suppress the fundamental mode of oscillation and to abstract the FM output at, say, 1000 megacycles which is the second harmonic of one-half the pump frequency. In this case the signal and image frequencies deviate over a 100-megacycle bandwidth centered on 1000 megacycles. The desired harmonic may be selected by such means as filters placed in the circuit between the tank and the mixer. Many other modifications are possible within the scope and spirit of the invention.

What is claimed is:

1. Apparatus for translating input signal information into a high index frequency modulated output signal comprising means for generating two synchonously related variable frequency oscillations, means for producing equal but opposite changes in the frequencies of said oscillations in response to input information, means for mixing said oscillations, and means for adbstracting from said mixing means energy of a frequency corresponding to the difference between the frequencies of said oscillations.

2. Apparatus for translating input signal information into a high index frequency modulated output signal comprising a parametric amplifier, means for supplying pump wave energy to said amplifier, means for causing said amplifier to oscillate at a variable frequency approximately equal to one-half the pump wave frequency whereby oscillation is also produced at an image frequency, means for varying said oscillation frequency in response to input signal information whereby equal but opposite variations are produced in the image frequency, and means for abstracting from said amplifier a frequency modulated output signal corresponding to the difference between said oscillation frequency and said image frequency.

3. Apparatus for translating input signal information into a high index frequency modulated output signal, comprising a variable capacitance parametric amplifier, means for supplying pump wave energy to said amplifier, means for causing said amplifier to oscillate at a first frequency approximately equal to one-half the pump frequency thereby simultaneously producing oscillation at a second frequency equal to the difference between the pump frequency and said first frequency, means for varying said first frequency in response to input signal information whereby equal but opposite variations are produced in said second frequency, and means for abstracting from said amplifier a frequency modulated output signal corresponding to the difference between said first and second frequencies.

4. Apparatus for translating input signal information into a high index frequency modulated output signal comprising a parametric amplifier, means for supplying pump wave energy to said amplifier, a resonant circuit shunting said amplifier, said circuit being resonant at a frequency approximately equal to one-half the pump frequency whereby said amplifier is made to oscillate at said resonant frequency and at an image frequency equal to the difference between said pump and resonant frequencies, means for varying the resonant frequency of said circuit in response to input signal information, whereby equal but opposite variations are produced in said image frequency, and means for abstracting a frequency modulated output signal corresponding to the difference between said resonant and image frequencies.

References Cited by the Examiner

UNITED STATES PATENTS

| | | | |
|---|---|---|---|
| 2,719,223 | 9/55 | Van der Ziel et al. | 332—30 |
| 2,962,676 | 11/60 | Marie. | |
| 2,970,275 | 1/61 | Kurzrok | 330—5 X |
| 2,992,398 | 7/61 | Sterzer | 330—5 X |
| 3,001,143 | 9/61 | Bruck. | |
| 3,018,443 | 1/62 | Bloom et al. | 330—5 |

ROY LAKE, *Primary Examiner.*

ROBERT H. ROSE, ALFRED L. BRODY, *Examiners.*